United States Patent [19]
Howell et al.

[11] 3,750,465
[45] Aug. 7, 1973

[54] ENGINE PERFORMANCE INDICATOR

[75] Inventors: John S. Howell; Richard L. Rowan, both of Fort Worth, Tex.

[73] Assignee: Howell Instruments, Inc., Fort Worth, Tex.

[22] Filed: Sept. 9, 1971

[21] Appl. No.: 179,141

Related U.S. Application Data

[63] Continuation-in-part of Ser. No. 89,580, Nov. 16, 1971.

[52] U.S. Cl. ............................. 73/117.3, 235/150.2
[51] Int. Cl. .......................................... G01m 15/00
[58] Field of Search .......................... 73/117.3, 116; 235/150.2, 150.22

[56] References Cited
UNITED STATES PATENTS

| | | | |
|---|---|---|---|
| 3,272,004 | 9/1966 | Haverl | 73/117.3 |
| 3,538,760 | 11/1970 | Atkey et al. | 73/117.4 |

*Primary Examiner*—Jerry W. Myracle
*Attorney*—Cushman, Darby & Cushman

[57] ABSTRACT

A method and means for measuring changes in the quality of gas turbine engine performance, efficiency or engine trim by measuring at least a first engine parameter such as RPM, computing a second engine parameter value such as exhaust gas temperature (EGT) from the first measured parameter, also measuring the actual value of the second engine parameter and subsequently comparing the computer with the actual values (after possible correction factors have been taken into account) to indicate changes in engine performance or trim. The computed and actual values may also be integrated prior to comparison or a difference between the computed and actual values may first be taken and this difference subsequently integrated for comparison with a standard comparison value such as may be obtained by integrating one of the parameters or a time representative signal over the same timed interval. If the comparison takes the form of a ratio, the periods of integration may be chosen to insure that the denominator is an even power of ten such that the integral representing the numerator may be directly interpreted as a performance index. Simpler trim test equipment is also disclosed for measuring engine parameters such as EGT and RPM and automatically converting such measurements to standard day conditions before display to permit quick static or ground trim testing without requiring numerous hand calculations.

10 Claims, 9 Drawing Figures

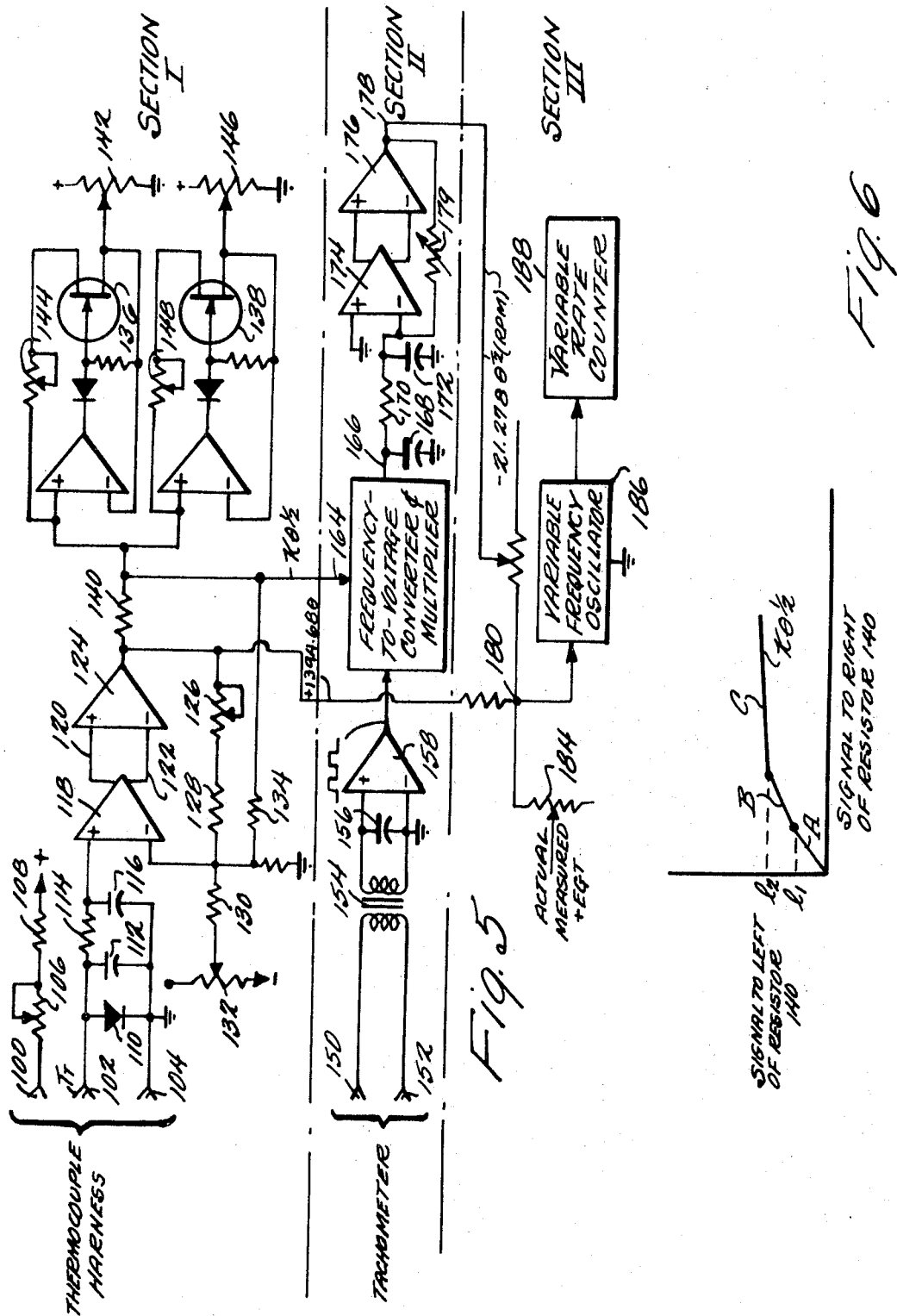

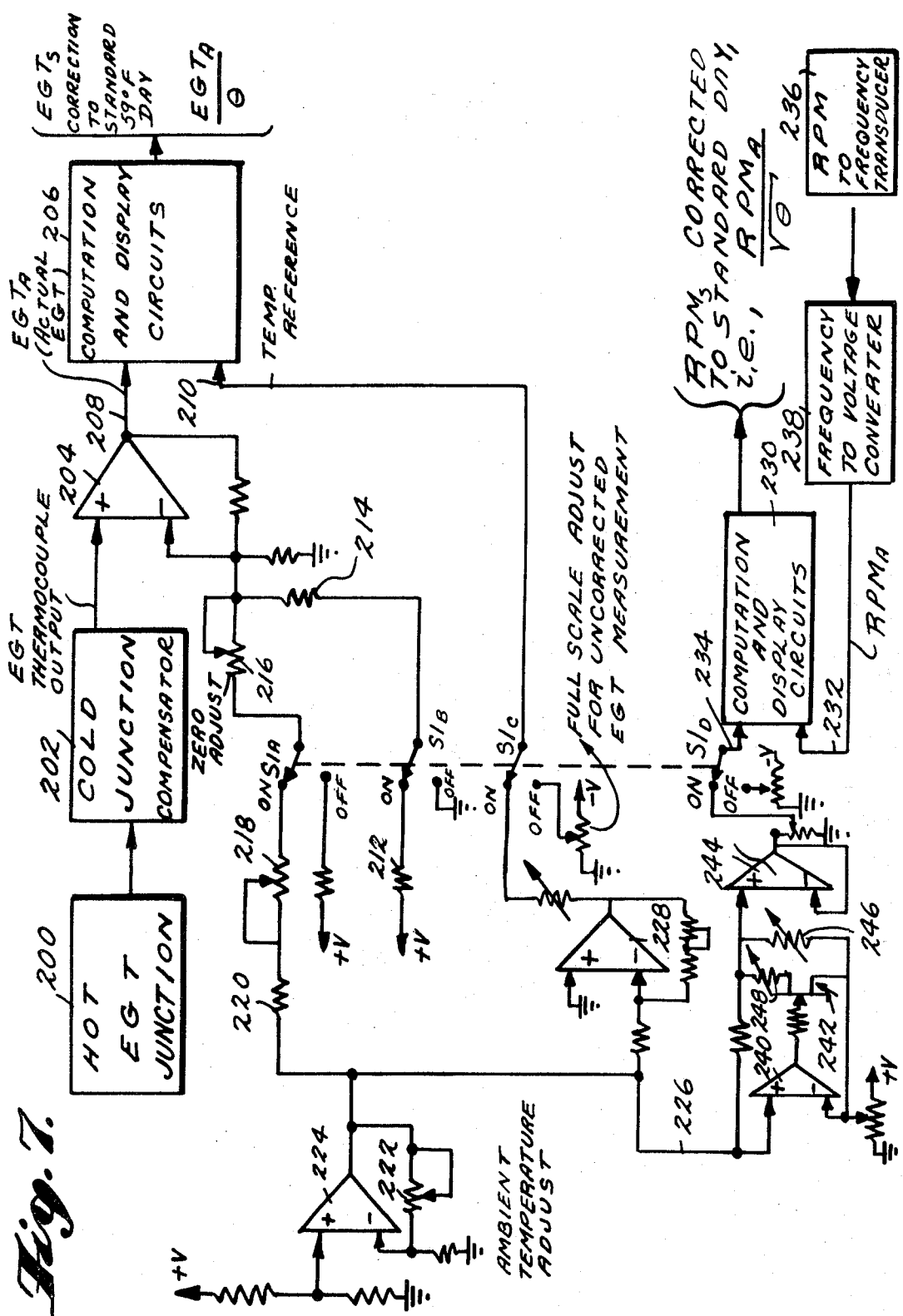

ENGINE PERFORMANCE INDICATOR

This application is a continuation-in-part of our earlier filed copending U. S. application Ser. No. 89,580, filed Nov. 16, 1971.

This invention relates to an instrument for indicating the performance or trim of a gas turbine engine (GTE). That is, this invention relates to a means and method for determining when undesirable changes in various engine adjustments have occurred which cause the gas turbine engine to perform outside desired limits of operation.

A gas turbine engine has proven to be an extremely reliable power source for aircraft and for other purposes such as for ship propulsion and stationary electric generating plants. However, a gas turbine engine is an extremely complex machine having a number of adjustments and other features which may experience change over a period of time so as to cause deterioration in overall engine performance. Some of these changes are very gradual and most cannot be immediately observed.

When all engine adjustments are proper and the engine is operating according to design, the engine is said to be "in trim" or to have an optimum quality of performance. On the other hand, when the engine parameters are not optimally related or when the engine is not operating according to desired design specifications, the engine is said to be "out of trim."

It is advantageous to detect such an "out of trim" condition as soon as possible so that corrective steps may be taken to put the engine back in trim again at the earliest possible opportunity. However, since many of these changes are subtle and difficult to detect, it is difficult for an operator of such an engine to obtain any positive indication of an engine being out of trim between regular engine overhauls.

Accordingly, it is an object of this invention to provide an engine performance indicator which may be used to give a ready indication of the quality of engine performance.

In accordance with the present invention a readily measurable variable corresponding to an engine operating parameter is compared with a computed value of that same variable based upon the measurement of another and different measurable variable. A comparison of these two signals represents a measure of engine performance and could be performed at various power settings, such as ground test "trim" engine runs. Likewise, at the end of a time period, e.g., upon the landing of an aircraft after a flight, inspection of the instrument will show any deviation that has occurred between the accumulated actual and computed values of the selected engine parameter.

If the engine is "in trim," the computed parameter value should track in a predetermined manner with respect to the actual measured value of that same parameter. However, if the engine is out of trim then a deviation in such tracking will occur and the reading of such a deviation by the operator after a flight will give a ready indication of the performance obtained from the engine and thus indicate whether the engine is still in trim or has begun to fall out of trim.

Of course, if the output device is located within view of the operator (e.g. pilot) the beginning of a deviation would be immediately apparent to the operator even during the flight. In fact, a signal can be generated to sound an alarm whenever such deviation begins to occur.

As a first simple illustration of the invention, assume a given model of gas turbine engine is equipped with the usual thermocouples in its tail pipe for measuring exhaust gas temperature (EGT) and a tachometer to measure engine shaft RPM. Given data taken over a period of time with a properly functioning engine of this model which is "in trim," the desired functional relationship between instantaneous EGT and RPM for an "in trim" engine may be established (either by empirical methods or directly by mathematical methods if a good mathematical model of the engine is available) and the EGT will be seen to be some function of RPM if, for the moment, other parameters are ignored.

The invention is carried out by providing a function generator which operates on a measured EGT signal according to the established "in trim" functional relation to provide an output signal representing the RPM. This computed RPM signal is then continuously compared with the actual RPM signal taken from the tachometer and as long as the computed and actual signals track with respect to one another, the engine is performing properly and is "in trim." However, should the computed and actual RPM signals undergo unexpected deviations with respect to one another, then it is readily apparent that something has occurred to degrade the performance of the engine thus causing it to be "out of trim."

Of course, in the foregoing example the RPM and EGT parameters could be reversed in their usage as, in fact, is the case with the exemplary embodiment disclosed in the following detailed description of the invention.

In practice, particularly aboard aircraft, altitude and outside air temperature will modify the functional relationship between EGT and RPM. The result is that one of the parameters i.e., EGT, is compared with all these perturbating parameters such as altitude and outside air temperature for a properly performing trimmed engine to provide empirical data from which a more elaborate functional relationship will be seen to exist and which includes compensation factors for these added perturbation factors.

As should be apparent to those skilled in the art, the particular engine parameters used in this invention need not be limited to only RPM and EGT parameters. In addition, there are other parameters such as fuel flow, thrust, mechanically adjustable elements such as nozzle areas and various pressure ratios which may be used in place of or in combination with the RPM and EGT parameters as will be apparent to those skilled in the art.

In addition, it is known that certain types of operation may produce spurious signals which should be blocked out of any computation or comparison made according to this invention. For example, it is known that in taxiing an aircraft, the pilot may run up the engine considerably to start the aircraft moving and then close the throttles quickly leaving the engines to revolve at high speed for some time without burning appreciable fuel. Under these circumstances, the instrument of this invention should be disconnected to prevent the temporary unreal relationship between RPM and EGT from causing an erroneous indication of poor engine performance.

A further embodiment of this invention is somewhat simpler in form and is often most advantageous for quick ground static trim testing although it could surely be used in other environments as well as will be apparent. Here, rather than compute a second engine parameter from a first, etc., the first engine parameter is first automatically corrected to standard day conditions and then used itself for comparison with acceptable limits of previously determined value ranges to detect out-of-trim conditions. Usually, the engine parameters selected for this type of measurement are EGT and RPM.

The engine manufacturer establishes ranges of RPM and EGT (when normalized to standard day conditions) that are permissible for an in trim engine condition. These ranges may, in fact, be empirically determined by the manufacturer for each delivered engine thus taking the unique characteristics of that particular engine into account. Usually, the trim indicating parameters are measured at some standard engine operating state such as a predetermined thrust, engine pressure ratio, etc.

Before this invention, ground test personnel would run a particular engine up to the proper operating state and take raw data readings for such parameters as RPM and EGT. Then after laborious hand and/or graphical calculations, the normalized data is compared with the manufacturer's specifications to see if the engine is in trim or not. If not found to be in trim, then some adjustment of the engine would be made and the entire laborious procedure repeated until the engine is put "in trim."

With this latest embodiment of the invention, the raw data is automatically converted into standard day data values which may be immediately checked against manufacturer specifications. In effect, it provides "on-line" continuous automatic normalized or standardized engine parameter data.

A more detailed and complete understanding of this invention may be obtained by carefully studying the following detailed description in conjunction with the drawings of which:

FIG. 5 is a schematic diagram of an exemplary embodiment of apparatus for carrying out this invention;

FIG. 6 is a graph for use in explaining the operation of the apparatus shown in FIG. 5;

FIG. 7 is a block and schematic diagram of a further embodiment of this invention;

In a properly adjusted gas turbine engine, there is a an optimum functional relationship between many of the engine operating parameters. This functional relationship may be determined empirically or mathematically as previously pointed out. In addition, this functional relationship may be subject to perturbations caused by variations in the engine operating environment such as outside air temperature and altitude. As with the basic functional relationship these perturbating parameters may also be taken into account in the functional relationship by empirical observation with a properly adjusted engine of a particular make and type.

Figure 1:
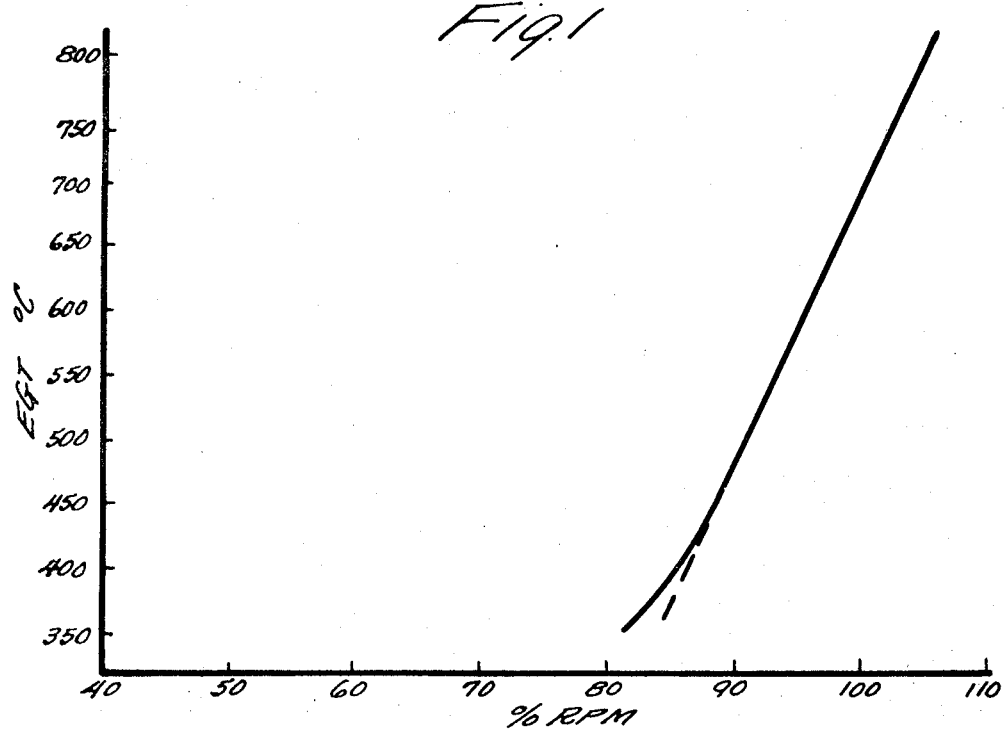
FIG. 1 is a graph showing a typical functional relationship between EGT and RPM for a particular aircraft.
Figure 2:
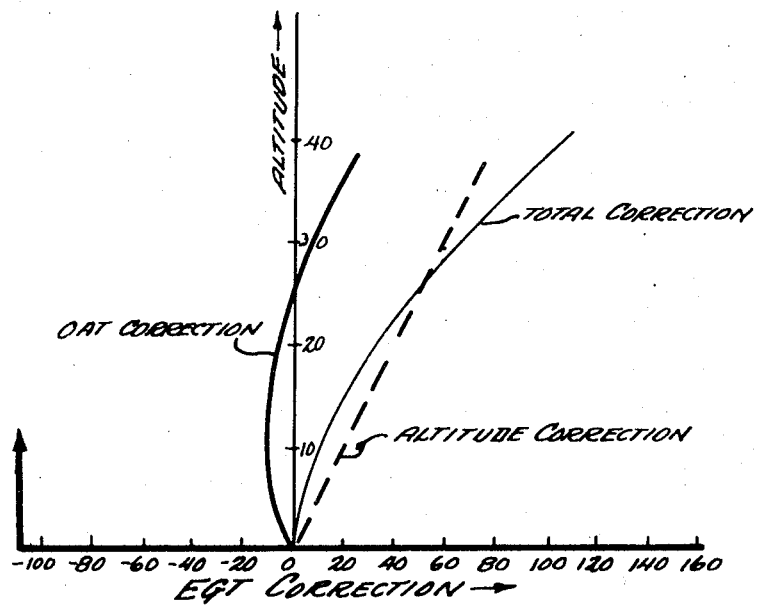
FIG. 2 is a graph showing typical EGT corrections to be made for operating air temperature and altitude as a function of altitude.

FIG. 1 reveals a typical EGT versus RPM functional relationship of the type which may be derived from empirical measurements on a gas turbine engine such as the J-57 turbine engine. In addition, FIG. 2 reveals various correction factors that must be taken into consideration with such an engine while operating in an aircraft at various altitudes ($h$) and under various conditions of outside air temperature (OAT). As a result of this sort of empirical data, a functional relationship as shown, may be derived between EGT and other engine operating and environmental parameters over a limited operating range.

Generally, the equation between these particular parameters may take the form of:

$$EGT = A(RPM) + B(OAT) + C(h^2) + D(h) + E$$

where A, B, C, D and E are constants.

For instance, one such equation which has been obtained for the J-57 engine is as follows:

$$EGT = 20.1(RPM) + OAT + 0.0505h^2 + 0.46h + 1332.1$$

It should be emphasized that this equation is given only for purposes of illustration of the general type of equation which may be forthcoming from empirical measurements upon a properly adjusted engine of any particular make and type for use in any particular application.

Using the engine parameters EGT and RPM for purposes of illustration only, it will now be appreciated by those skilled in the art that the measurement of one parameter will permit the calculation of an optimum or "in trim" value for the other or second parameter which may then be compared with the actual measured value of the second parameter. If the engine is "in trim" and operating according to design specifications, the calculated and actually measured values of the particular engine parameters selected for comparison should track together in a predetermined manner.

On the other hand, if the engine performance is degraded or taken "out of trim" by any factor, then the functional relationship between the parameters will change accordingly and the computed value of the selected engine operating parameter will no longer track with the actual measured value of the parameter.

Thus, a very convenient indicator for indicating the quality of engine performance may be obtained by comparing such computed and actual parameter values. A difference signal would give an instantaneous deviation from a "normal" engine. This instantaneous deviation could also be average over a period of time, such as a fixed interval of time or over an entire flight to indicate the average deviation of the measured parameter. By integrating the computed and actual measured values of the parameter and comparing the integrated results after a set predetermined period of time (such as after an airplane flight), a ratio may be obtained to indicate engine performance. The integrated differences between computed and actual values may also be compared to give an indication of the quality of engine performance. That is, the difference between the computed and measured value of a parameter may itself be integrated and compared with the integration of a fixed variable with respect to the engine operation such as time or a variable proportional to the engine speed. The denominator in any ratio comparisons may be chosen to be an even power of 10 such that the numerator may be directly interpreted as a performance index.

Figure 3:
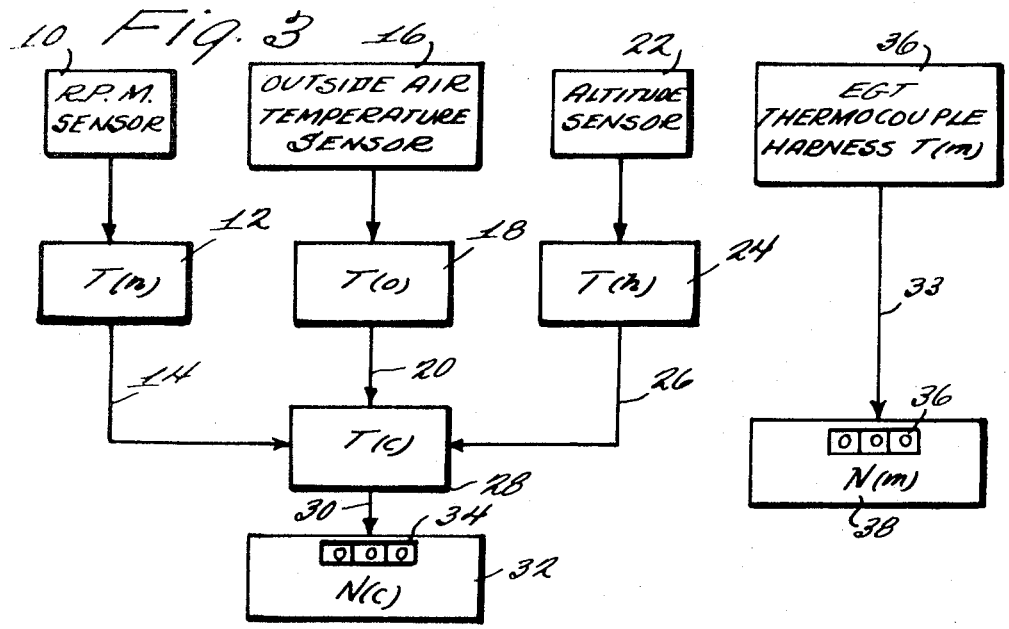
FIG. 3 is a block diagram of an engine performance indicator constructed according to the teaching of this invention.

FIG. 3 reveals a block diagram of an indicator according to this invention wherein an RPM sensor 10 senses the engine speed or the number of revolutions per minute of the engine shaft to provide an input signal to a function generator 12 which operates on the speed signal from sensor 10 to produce an output signal on line 14 representing the contribution to engine gas temperature (EGT) from its dependence upon RPM. In addition, there is an outside air temperature sensor 16 which in combination with function generator 18 provides a correction signal for perturbations caused by changes in outside air temperature on line 20. Similarly, an altitude sensor 22 in combination with function generator 24 provides a signal on line 26 which compensates for changes in EGT due to altitude.

Function generator 28 combines the signals on lines 14, 20 and 26 to provide an output signal on line 30 representing the optimum value of engine gas temperature as computed according to the predetermined functional relationship between EGT and RPM in combination with the perturbations caused by changes in outside air temperature and altitude.

The signal on line 30 representing the magnitude of the computed EGT is then integrated by integrating device 32. For instance, the signals on line 30 may be pulses occurring at a rate proportional to the magnitude of the computed EGT and the integrating device 32 may be a counting device either mechanical or electrical which includes a display 34 for displaying the contents thereof. At the same time, the actual EGT is measured by thermocouple harness 37 and the output of this actual measurement is accumulated in another integrating device 38 which may also comprise a counting device with an indicating means 36.

Thus if, at the beginning of the flight, counters 32 and 38 are each reset to zero and then, at the end of a predetermined period of time, the contents of the counters on indicators 34 and 36 are compared with one another, the comparision should result in a predetermined fixed result unless the engine is "out of trim." Of course, it should be appreciated by those skilled in the art that instead of a visual inspection of indicating devices 34 and 36, automatic electronic comparison means may be provided for comparing the contents of integrating devices 32 and 38 and for providing some sort of automatic indicating of any unexpected deviation therebetween.

Figure 4:
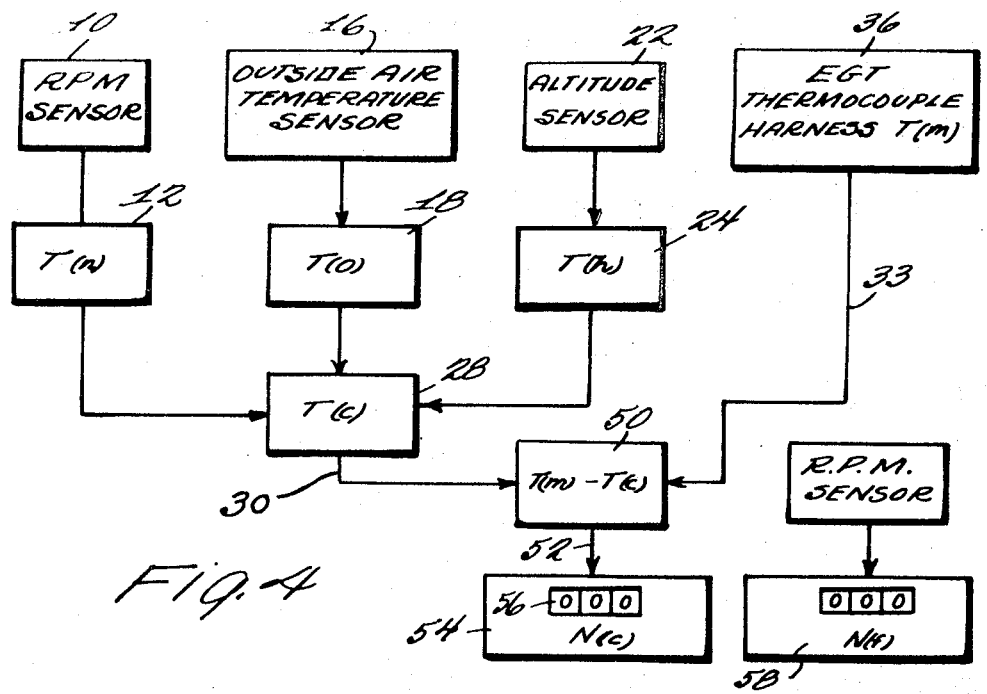
FIG. 4 is a block diagram of a modification of the indicator shown in FIG. 3.

A modification of the device shown in FIG. 3 is depicted in block form at FIG. 4. Here, the signal representing the computed value of EGT on line 30 and that representing the measured actual value of EGT on line 33 are computed and measured exactly as described before with respect to FIG. 3. Now, however, the computed value is effectively subtracted from the measured value by an appropriate subtracting device 50 which provides a signal on line 52 representing the magnitude of the difference between the computed and measured values of EGT. The deviation or difference signal on line 52 is then integrated in an integrating device 54 which may, as before, comprise a counter for accumulating pulses and may have an indicating means 56 for indicating the contents thereof.

Of course, if the measured and computed values are exactly the same under completely ideal conditions, a signal on line 52 should theoretically indicate a zero difference value and the contents of integrating device 54 would therefore remain substantially at zero with changes in engine performance or trim being indicated by any substantial contents in integrator 54. However, it is usually the case that, rather than being exactly equal, the computed and measured values differ by a fixed amount. Therefore, the difference signal on line 52 will cause integrating device 54 to integrate a constant signal and thus provide a linearly increasing output indication at 56. Thus, to detect change in engine trim or performance, the contents of integrator 54 must be compared with the contents of a similar integrator which is also integrating a constant for fixed input signal.

This could be accomplished for instance by integrator 58 integrating signals from a fixed clock source. However, since the expected difference between the measured and the computed values of EGT is in reality also a function of RPM, the integrator 58 actually integrates a signal which is proportional to RPM as indicated in FIG. 4.

Thus, for any given RPM, the integrator does indeed act to integrate a fixed or constant input while the integrator 54 integrates the difference between the measured and computed values of EGT. Provided the engine is "in trim," this difference will also be constant and the two integrators 54 and 58 will track together. However, if the engine is "out of trim" then, the difference between the measured and computed values of EGT will not be fixed and the two integrators 54 and 58 will no longer track together. As with the device shown in FIG. 3, those that are skilled in the art will readily appreciate that automatic comparison means might be readily connected between integrators 54 and 58 to provide an automatic indication of any unexpected deviation therebetween.

FIG. 5 is a schematic diagram of an exemplary embodiment of an apparatus with which this invention may be practiced for the J–57 engine installed in an F102 aircraft.

Upon experiment, the following functional relationship between EGT (Engine Exhaust Gas Temperature), RPM (High Pressure Compressor Speed) and $\theta$ (Total Air Temperature $T_T$ divided by 519) has been obtained for the F102 aircraft with the J–57 engine over a limited operational range, the overall equation being non-linear. Of course other aircraft/engine combinations may require that other parameters be used to obtain a dependable functional relationship as pointed out above and as will be obvious to those skilled in the art:

$$\text{EGT} = 21.27\ \theta^{1/2}\ \text{RPM} - 1394.68\ \theta + \text{Constant}.$$

(Of course the constants would vary for other engines and/or operating conditions. Here, the equation includes corrections to standard day conditions as should be apparent to those skilled in the art.) The EGT computed from the above equation using measured $\theta$ and RPM is compared to the actual EGT as provided by the engine thermocouples. The difference in these two values is used to drive a variable rate digital counter. When no difference exists, the variable rate counter counts at the same rate as a reference fixed rate counter.

The ratio of the variable rate counter to the fixed rate counter is therefore an indication of engine performance and is termed the "Engine Performance Index." A ratio of 1:1 indicates that the programmed EGT-RPM relationship exists. When the ratio is greater or less than 1:1 it is an indication of degraded engine performance which could be caused by incipient turbine, compressor, bearing or fuel control failure, or other failure.

As mentioned above, meaningful data may not be obtained when the engine is at low power levels. Therefore, the apparatus for practicing this invention preferably includes a suitable device for turning the indication off whenever the engine power setting is below a certain preset limit.

Also, since it is only necessary to sample the engine data in order to determine the quality of engine performance, the unit may include timing means for permitting operation only during a limited period of time per flight. After a fixed rate (representing the denominator of a ratio) of 1,000 has been reached on a fixed rate counter, the indication on the variable rate counter is the average deviation with a reading of 1,000 indicating that the programmed EGT–RPM relationship exists. Of course, both counters must be reset prior to each flight.

As shown in FIG. 5, Section I includes the circuitry required to generate the $\theta$ functions. The input to this section is connected to a Total Air Temperature resistance probe with one output representing 1394.68 $\theta$ (or some other multiple of $\theta$ for a different engine) being presented to a summing node in Section III while another output proportional to $\theta^{1/2}$ being input to Section II. Another input to Section II is from the tachometer being proportional to RPM. The input frequency from the engine tachometer generator is converted to a DC voltage and operated on by the $\theta^{1/2}$ function from Section I with the output from Section II $-21.27\ \theta^{1/2}$ [RPM] (or some other constant times $\theta^{1/2}$ [RPM] for another engine) being fed to the summing node in Section III. A comparision to the actual EGT is made by also presenting a signal representing the actual EGT to the summing node in Section III. The result ($EGT_{ACTUAL} - EGT_{COMPUTED}$) is then used to control and deviate from a normal fixed rate the frequency of a variable frequency oscillator driving a counter. At the end of a timed period of engine operation above a fixed EGT temperature corresponding to 1,000 counts of the normal fixed rate of the oscillator, this counter then indicates the average deviation of EGT during the time period, or an Engine Performance Index (EPI). To those skilled in the art, it should be apparent that an average ratio or other function of integrated or average deviations could be easily obtained and utilized.

The Total Air Temperature resistance probe is connected to connections 100, 102 and 104, as shown in FIG. 5. Connection 100 provides an excitation supply through resistors 106 and 108 while connection 104 is grounded. The signal $T_T$ on connector 102 is filtered by elements 110, 112, 114 and 116 before being input to the non inverting input of a differential operational amplifier 118 (such as the Fairchild 727 integrated circuit) while the complementary outputs on lines 120, 122 are input to the inputs of a further differential operational amplifier 124. The inverting input to amplifier 118 receives a feedback signal through resistors 126, 128 and a constant offset level from resistors 130, 132. A further compensating input through resistor 134 will be explained below.

Since $\theta = (T_T/519)$ and since the output of amplifier 124 is proportional to $T_T$, by properly adjusting the gain, the output may represent 1394.68 $\theta$ or any other linear function of $\theta$, as one of the terms in the previously mentioned equation for EGT.

The square root $\theta$ function is approximated by three straight line segments as shown in FIG. 6. Segment A is in effect when both transistors 136, 138 are "off" thus effectively leaving resistor 140 unshunted to provide Segment A of the $K\theta^{1/2}$ curve. When the signal to the right of resistor 140 reaches a first predetermined level $l_1$, the potentiometer 142 has been previously adjusted to result in FET 136 being switched "on." Thus the slope of the curve in FIG. 6 is altered at this point to follow segment B since resistor 144 is now shunted to a fixed voltage level. Of course, the slope of segment B may be changed by adjusting resistor 144. Similarly, when the level reaches $l_2$ (as determined by resistor 146) FET 138 switches "on" to include resistor 148 in the output circuit during segment C. The slope of segment C may also be varied by varying resistor 148 as will be apparent to those skilled in the art.

Accordingly, by properly choosing resistor 140 and adjusting potentiometers 142, 146 and 144, 148 appropriately, the signal to the right side of resistor 140 may be caused to be approximately proportional to the square root of $\theta$.

It has also been discovered that the non linearities of the resistance probe may be compensated by feeding back this square root function to the inverting input of amplifier 118 through resistor 134 as shown in FIG. 5.

The tachometer signal proportional to RPM is input to Section II of FIG. 5 through connectors 150, 152 to transformer 154. After filtering by capacitor 156 and amplification by amplifier 158, the alternating tachometer signal in input on line 160 to frequency-to-voltage converter and multiplier 162. Here the tachometer signal is converted to DC and multiplied by the square root $\theta$ function input thereto on line 164. Thus, the output of frequency-to-voltage converter and multiplier 162 on line 166 is proportional to $\theta^{1/2}$ (RPM).

After filtering by elements 168, 170 and 172, this signal is input to the inverting input of amplifier 174. Amplifier 174 is cascaded with amplifier 176 similarly to amplifiers 118, 124 previously discussed to provide linear amplification (albeit inverted in this case). Thus, the output on line 178 may represent $-21.27\ \theta^{1/2}$ (RPM) or some other constant times $\theta^{1/2}$ [RPM] depending upon the gain adjustment of resistor 179.

These computed components of the equation $$EGT = 21.27\ \theta^{1/2}\ (RPM) - 1394.68\ \theta$$

are then combined at summing node 180 with a signal representing the actual EGT as input on line 182 through potentiometer 184. The result is $EGT_{ACTUAL} - EGT_{COMPUTED}$ and is input to the oscillator 186 to control the output frequency thereof. The output of controlled oscillator 186 is then accumulated in a counter 188 for subsequent interpretation as the Engine Performance Index.

As will be apparent to those skilled in the art, many of the necessary biasing ocmponents, etc. are not shown in FIG. 5. Also, it should be emphasized that the example shown in FIG. 5 is exemplary only and that other techniques and circuits may be used for practicing this invention.

Likewise, device for de-activating the apparatus at low power settings or whenever improper operating conditions exist may be readily devised by those skilled in the art. For instance, the error signal at node 180 may be compared with reference values and whenever the error exceeds predetermined maximum limits, it may be interpreted as indicating an unreal operating condition (such as takeoff, etc.) and the apparatus may be de-activated until the error signal again falls within predetermined limits. A possible maximum limit for use in this regard is 400 degrees of EGT.

Figure 8:
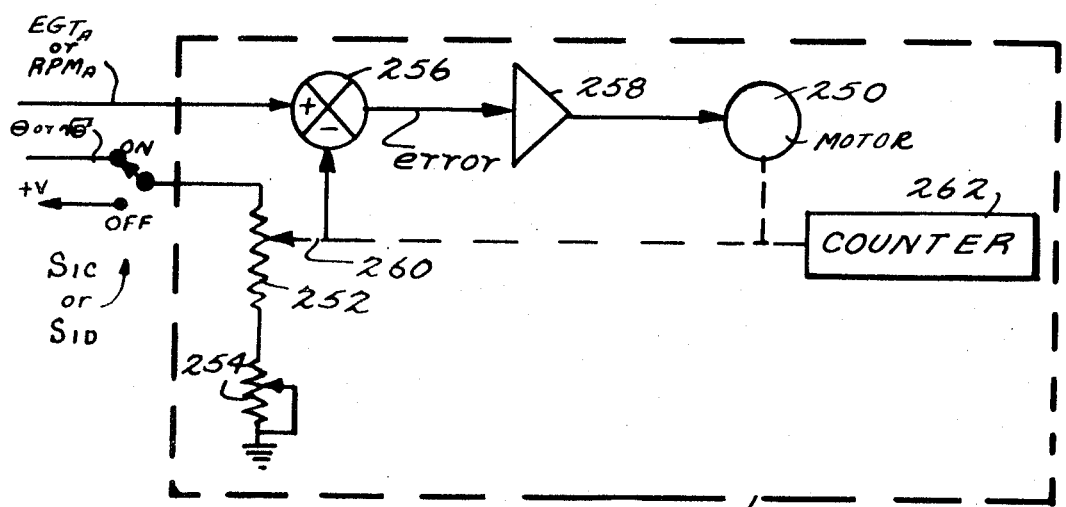
FIG. 8 is a schematic diagram of a modification of the FIG. 7 embodiment.
Figure 9:
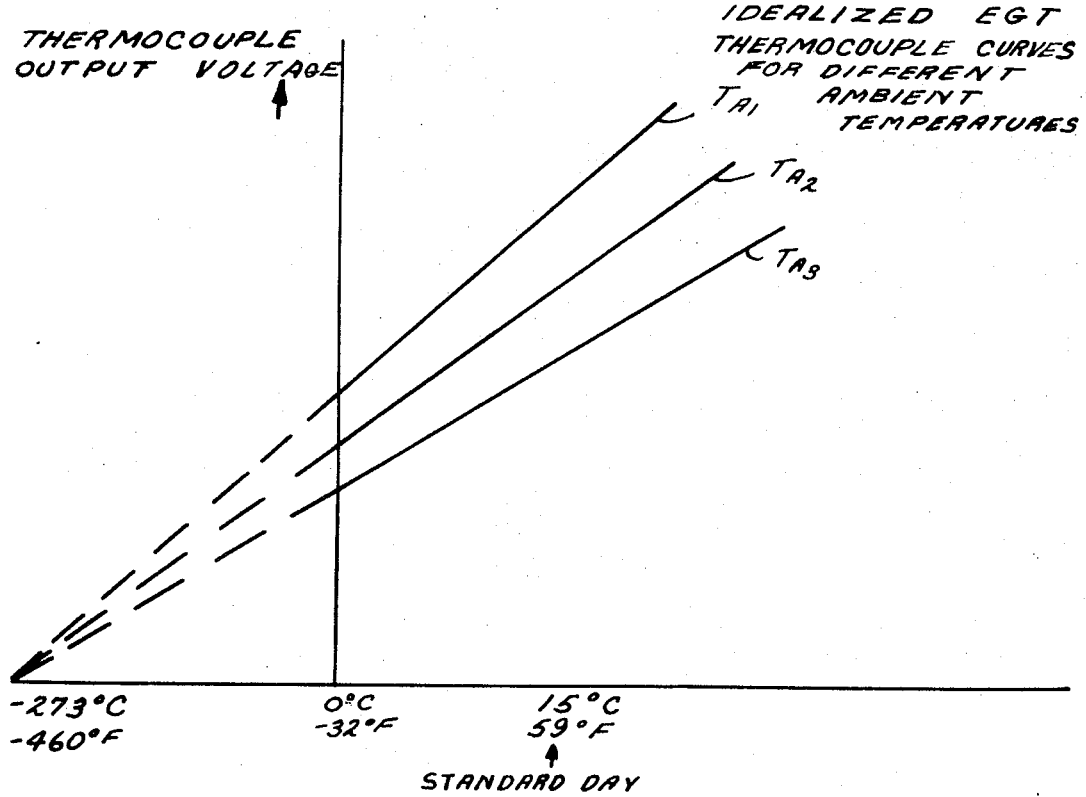
FIG. 9 is a graph showing a family of typical idealized thermocouple output curves for various ambient temperatures.

The further embodiment of this invention providing standardized engine parameter values per se, for use in determining engine trim conditions is shown specifically in FIGS. 7–9. However, it should be noted that similar results could be obtained by utilizing only a portion of the earlier described embodiments shown in FIGS. 1–6. That is, the previously described embodiment also inherently provides for normalizing the measured data to standard day conditions albeit the data is utilized as a part of other more complex calculations and/or other operations.

Referring now to FIG. 7, those skilled in the art will appreciate that the usual engine EGT thermocouples includes a hot junction 200 and a cold junction compensator 202 which provide an EGT thermocouple output.

As shown in idealized form at FIG. 9, this output is actually a function of the ambient field temperature on the cold junction as well as the hot junction temperature. It is preferable to remove this dependency in order to obtain a true actual EGT measurement before applying further correction factors to obtain a corresponding "standard day" EGT for display. That is, it can be converted to standard day conditions through division by $\theta$. However, before the true actual EGT can be obtained, the EGT thermocouple output must be corrected by perturbations caused by ambient temperature changes at the cold junction. Since $\theta$ is proportional to the ambient temperature, this means that the correction factor is also a function of $\theta$.

As shown in FIG. 7, the uncorrected EGT signal is input to the non inverting input of an amplifier 204 while various correction factors are applied to the inverting input of amplifier 204. The output then of amplifier 204 is the actual $EGT_A$ or the numerator in the equation for the corresponding standard day $EGT_S$:

$$EGT_S = (EGT_A/\theta) = (EGT_{thermocouple} - \text{corrections}/\theta)$$

The actual division of $EGT_A$ by $\theta$ and the display of $EGT_S$ is performed by a conventional computation and display circuit 206 which takes $EGT_A$ as one input 208, and $\theta$ as another input 210 when switch $S_1$ is "on." As shown, mode switch $S_1$ may also be switched to an "off" or uncorrected mode to provide an output reading of uncorrected EGT and RPM if desired. However, since the uncorrected mode is of little interest here, the explanation will be confined to the "on" switch condition as shown in the drawing.

Some conventional computation circuits 206 require a zero based input (i.e. 0 volts for a zero input parameter value). To accomplish this, the thermocouple output must be electrically shifted via correction factors input on the inverting input of amplifier 204. A first fixed correction factor is applied via resistors 212 and 214 to approximately zero base the $EGT_A$ output of amplifier 204. Then, since the total required correction factor is a function of $\theta$ (as previously discussed with respect to FIG. 9), an added correction factor is applied via resistors 216, 218 and 220 as a function of $\theta$ to result in a zero based $EGT_A$ input to computation circuits 206.

The $\theta$ function is actually obtained by dialing in the ambient temperature on resistor 222 to control the gain and hence output of amplifier 224 as a function of $\theta$, proportional to $\theta = (T/519)$ where $T =$ the ambient temperature.

Variable resistor 216 may be used to obtain a zero adjustment when switch $S_1$ is "off" and then variable resistor 218 provides a similar zero adjustment when switch $S_1$ is "on."

The $\theta$ function on line 226 is also inverted by amplifier 228 and then applied to reference input 210 of the computation circuits 206. In this manner, computation and display circuits 206 receive both $EGT_A$ and $\theta$ as analog inputs for conventional computation of $EGT_S = (EGT_A/\theta)$. The computation circuits may be any conventionally available analog and/or analog-digital computation device coupled to drive an appropriate display or output indicator to record the computed $EGT_S$.

A corrected standard day $RPM_S = (RPM_A/\sqrt{\theta})$ is also computed and displayed by similar or conventional computation and display circuits 230 from an $RPM_A$ input on line 232 and a $\theta$ input on line 234.

The $RPM_A$ input is obtained in a conventional manner from an RPM-to-frequency converter or transducer 236 and a frequency-to-voltage converter 238 as shown in FIG. 7. The $\sqrt{\theta}$ function is obtained in a manner similar to that already explained in the first embodiment in FIG. 5, Section I. During a first low range of $\theta$ input values to amplifier 240, FET 242 is "off" and the input to amplifier 244 is primarily determined by resistor 246 which is preset to achieve a predetermined linear approximation to $\sqrt{\theta}$ at the output of amplifier 244 for this first low range. Then when FET 242 switches "on" in the higher range of $\theta$ values, resistor 248 is switched in and can be adjusted to determine a linear approximation to $\sqrt{\theta}$ for this higher range. Of course, by adjusting the gain of amplifier 240, etc., the switch point could also be adjusted if desired. In addition, further FET switches and devices could be incorporated to achieve more linear segments in the $\sqrt{\theta}$ linear approximation if desired; however, the two segment approximation described here should be sufficient for at least limited ranges of $\theta$.

A servo-mechanical realization, of this embodiment is shown in FIG. 8 where the computation and display circuits 206 and 230 comprise servo controlled motor 250 driving a potentiometer 252. The denominator ($\theta$ or $\sqrt{\theta}$) function is input (via switch $S_{1C}$ or $S_{1D}$ respectively) to a tape potentiometer 252 (and perhaps other resistors 254). The numerator function ($EGT_A$ or $RPM_A$) is input to a non inverting input of summer 256 while the tap voltage from potentiometer 252 is applied to the inverting input of summer 256. The resulting difference or error voltage drives motor 250 (through driver 258) which, in turn, drives the tap 260 of potentiometer 252. Thus, if the denominator function voltage ($\theta$ or $\sqrt{\theta}$) is small, the tap 260 must be driven up relatively high on potentiometer 252 to achieve a zero error voltage. On the other hand if the denominator voltage is high, then tap 260 need be driven up by a substantially lesser amount. Accordingly, it will be appreciated that by counting (with counter 262) the number of rotations of motor 250 needed to achieve zero error voltage, the desired ratio of $EGT_A$ or $RPM_A$ to $\theta$ or $\sqrt{\theta}$ will be obtained as a direct readout on counter 262, providing the gearing ratios, resistance values, etc. are chosen judiciously as will be apparent to those in the art.

Although only a few embodiments of this invention have been described in detail above, those skilled in the art will readily appreciate that many modifications of the basic concepts disclosed above are possible without departing from the true scope and spirit of this invention. For instance, as has been specifically pointed out above, the particular engine parameters of RPM and EGT used for illustrative purposes above may be replaced either entirely or in part by other environmental engine parameters such as fuel flow, thrust, various mechanical adjustments and/or pressure ratios.

The ambient temperature adjustment to obtain a $\theta$ function voltage has been shown as a manually adjustable means; however, those skilled in the art will readily realize that this could just as well be made completely automatic such as, for example, by using an ambient temperature dependent impedance like a thermistor, etc.

Further, it should be apparent to those skilled in the art that a whole family of parameters could be utilized for comparison purposes rather than single parameters. Such a family of parameters could be advantageously used, for instance, in conjunction with electronic computing means whereby each of several parameters are computed, weighted and combined before comparison to a standard value.

Accordingly, all such modifications of the above disclosure are intended to be included within the scope of this invention.

What is claimed is:

1. A trim tester for measuring the performance quality of a gas turbine engine, said trim tester comprising:
   transducer means for providing an electrical signal proportional to an engine operating parameter,
   ambient parameter adjustment means for providing an electrical signal related to an ambient environmental condition; and
   computation and display means connected to both said transducer means and to said ambient parameter adjustment means for automatically computing a normalized value for said engine operating parameter corresponding to standard day conditions with the applicable correction factor being obtained from said ambient environmental condition and for displaying said normalized value to permit direct comparison with predetermined normalized value ranges as an indication of engine trim.

2. A trim tester as in claim 1 wherein:
   said transducer means comprises a thermo-couple means for measuring actual engine exhaust gas temperature $EGT_A$ and said ambient environmental condition is temperature,
   said ambient parameter adjustment means comprises a variable impedance for controlling an electrical signal in proportion to the ambient temperature and therefore in proportion to $\theta$, where $\theta$ is total air temperature divided by 519, and
   said computation and display means includes means for computing and displaying the value of $EGT_A/\theta$.

3. A trim tester as in claim 2 wherein said thermocouple means includes means for correcting the raw output signal of thermocouple devices to the actual $EGT_A$, the correction factors being a function of $\theta$ or ambient temperature.

4. A trim tester as in claim 3 wherein said means for correcting comprises a differential amplifier having one input connected to receive an uncorrected EGT voltage from a thermocouple transducer and another differential input connected to said ambient parameter adjustment means whereby the differential input receives a correction voltage which is a function of $\theta$.

5. A trim tester as in claim 1 wherein:
   said transucer means comprises means for measuring actual engine speed $RPM_A$ and said embient environmental condition is temperature,
   said ambient parameter adjustment means comprises a variable impedance for controlling a first electrical signal in proportion to ambient temperature and means for utilizing said first electrical signal to produce a second electrical signal approximately proportional to the square root of $\theta$, where $\theta$ is total air temperature divided by 519, and
   said computation and display means includes means for computing and displaying the value of $RPM_A/\sqrt{\theta}$.

6. A trim tester as in claim 1 including further transducer means and further computation and display means, and wherein
   the first mentioned transducer means comprises a thermocouple means for measuring actual engine exhaust gas temperature $EGT_A$,
   said ambient parameter adjustment means comprises a variable impedance for controlling a first electrical signal in proportion to the ambient temperature and therefore in proportion to $\theta$ where $\theta$ is total air temperature divided by 519,
   the first mentioned computation and display means comprises means for computing and displaying the value of $EGT_A/\theta$,
   said further transducer means comprises means for measuring actual engine speed $RPM_A$,
   said ambient parameter adjustment means further comprising means for utilizing said first electrical signal to produce a second electrical signal approximately proportional to the square root of $\theta$, and
   said further computation and display means includes means for computing and displaying the value of $RPM_A/\sqrt{\theta}$.

7. A trim tester as in claim 6 wherein said thermocouple means includes means for correcting the raw output signal of thermocouple devices to the actual $EGT_A$, the correction factors being a function of $\theta$ or ambient temperature.

8. A trim tester as in claim 7 wherein said means for correcting comprises a differential amplifier having one input connected to receive an uncorrected EGT voltage from a thermocouple transducer and another differential input connected to said ambient parameter adjustment means whereby the differential input receives a correction voltage which is a function of $\theta$.

9. A trim tester as in claim 6 wherein said first mentioned computation and display means and said further computation and display means each comprise a servo system including:
- a variable potentiometer connected to receive a voltage thereacross proportional to a desired denominator function,
- a differential summing means connected to a movable tap on said potentiometer and connected to receive a voltage proportional to a desired numerator function for providing an error voltage proportional to the difference between the numerator function input and the voltage at said movable tap,
- motor means,
- driving means connected to said differential summing means and to said motor means for driving said motor from said error voltage,
- said motor being mechanically linked to drive said movable tap thereby completing a servo loop, and
- a counter also effectively linked to the motor for accumulating counts proportional to the movement of the movable tap whereby the counter contents is proportional to the ratio of said numerator function divided by said denominator function.

10. A trim tester as in claim 1 wherein said computation and display means comprises a servo system including:
- a variable potentiometer connected to receive a voltage thereacross proportional to a desired denominator function,
- a differential summing means connected to a movable tap on said potentiometer and connected to receive a voltage proportional to a desired numerator function for providing an error voltage proportional to the difference between the numerator function input and the voltage at said movable tap,
- motor means,
- driving means connected to said differential summing means and to said motor means for driving said motor from said error voltage,
- said motor being mechanically linked to drive said movable tap thereby completing a servo loop, and
- a counter also effectively linked to the motor for accumulating counts proportional to the movement of the movable tap whereby the counter contents is proportional to the ratio of said numerator function divided by said denominator function.

* * * * *